(12) United States Patent
Rowe

(10) Patent No.: US 6,559,833 B2
(45) Date of Patent: *May 6, 2003

(54) APPARATUS AND METHOD FOR ACHIEVING ABSOLUTE AND RELATIVE POSITIONING OF A GRAPHICS CURSOR

(75) Inventor: Mark Steven Rowe, Philomath, OR (US)

(73) Assignee: Hewlett-Packard Development Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 103 days.

(21) Appl. No.: 09/164,939

(22) Filed: Oct. 1, 1998

(65) Prior Publication Data

US 2003/0048259 A1 Mar. 13, 2003

(51) Int. Cl.⁷ .................................. G09G 5/08
(52) U.S. Cl. ................ 345/173; 345/174; 345/175; 345/156; 345/157; 345/158; 345/159
(58) Field of Search ................ 345/173, 174, 345/175, 157, 156, 158, 159

(56) References Cited

U.S. PATENT DOCUMENTS

| 4,589,061 A | | 5/1986 | Nordstrom ............... 364/157 |
| 4,782,327 A | | 11/1988 | Kley et al. ............... 340/365 |
| 4,935,728 A | | 6/1990 | Kley ....................... 340/709 |
| 5,327,161 A | * | 7/1994 | Logan et al. ............. 345/157 |
| 5,355,148 A | * | 10/1994 | Anderson ................. 345/166 |
| 6,020,878 A | * | 1/2000 | Robenson ................. 345/173 |

FOREIGN PATENT DOCUMENTS

| GB | 2266038 A | 10/1993 |
| WO | WO95/09402 | 4/1995 |
| WO | WO96/07966 | 3/1996 |

* cited by examiner

Primary Examiner—Richard Hjerpe
Assistant Examiner—Jean Lesperance

(57) ABSTRACT

A touchpad and supporting logic that provides absolute or relative positioning of a graphics cursor on a display. Absolute positioning is preferably invoked by touching the touchpad in a designated region. Relative positioning is preferably implemented by continual movement across a touchpad relative to a reference location. A method of achieving absolute and relative positioning is also disclosed.

14 Claims, 2 Drawing Sheets

APPARATUS AND METHOD FOR ACHIEVING ABSOLUTE AND RELATIVE POSITIONING OF A GRAPHICS CURSOR

FIELD OF THE INVENTION

The present invention relates to positioning a graphics cursor on a computer display and to a positioning device that permits both absolute and relative positioning.

BACKGROUND OF THE INVENTION

The prior art contains many devices for positioning a graphics cursor within a graphics user interface (GUI) Examples of known input or positioning devices include touchpads, touch screens, track balls, computer tablets and computer mouse products. These devices utilize either absolute or relative positioning schemes to achieve placement of a cursor at a desired location.

Absolute positioning schemes are commonly implemented in devices such as graphic tablets and touch screens. In absolute positioning, there is a one to one correspondence between a point on the positioning device and a point on the computer screen. Thus, designation of a point on the positioning device results in a predefined response at the corresponding position on the computer screen. Disadvantages of absolute positioning include that the devices tend to be relatively large to maximize the number of selectable points on the input device, the devices tend to lack precision (i.e., fine positioning cannot be achieved) and the devices are often prone to alignment problems in which it is difficult to have specific positions on the input device repeatedly translate to the same point on the computer screen. Relative positioning schemes are commonly utilized in devices such as track balls, mice and touchpads, etc. In relative positioning, a graphics cursor is positioned by moving an input device relative to its current position. Relative positioning schemes generally strike a compromise between the effective handling of large graphics cursor movements and fine positioning. The result of this compromise is often a positioning device that achieves neither desired levels of large graphics cursor movement or fine positioning.

A related positioning scheme is acceleration-based relative positioning. In this scheme, the rate at which the input device is accelerated corresponds to the rate at which the graphics cursor is moved. While acceleration-based techniques facilitate both fine positioning and large graphics cursor movements, their design and implementation are complicated. The use of acceleration based devices can also be frustrating not only to new users but also to experienced users that are used to a device with a slightly different acceleration sensitivity.

U.S. Pat. No. 5,327,161, issued Jul. 5, 1994, to James Logan and Blair Evans is representative of prior art positioning devices. While prior art positioning devices have contributed to the advancement of computer-user interfaces, there is room for improvement. For example, at times a user may desire absolute positioning to immediately move to a desired location on a screen. At other times, a user may desire relative positioning for efficient placement of a graphics cursor relative to its previous position, e.g., in positioning a graphics cursor amongst text characters.

A need thus exists for a positioning device that provides both absolute positioning, e.g., for large graphics cursor movements, and relative positioning, e.g., for fine placement of a graphics cursor.

SUMMARY OF THE INVENTION

Accordingly, it is an object of the present invention to provide a method of achieving both absolute and relative positioning in a computer (or other electronic device) input device.

It is another object of the present invention to provide an input device that is capable of achieving both absolute and relative positioning of a graphics cursor or the like.

It is also an object of the present invention to provide a computer or other electronic device that incorporates such an input device.

These and related objects of the present invention are achieved by use of the apparatus and method for achieving both absolute and relative positioning of a graphics cursor as described herein.

In one embodiment, the present invention includes a method of positioning a graphics cursor that includes the steps of receiving a touched location indicating signal from a touchpad; determining from a touched location indicating signal whether to invoke an absolute positioning mode of operation or a relative positioning mode of operation; and generating, in said absolute positioning mode of operation, a signal that facilitates formation of a graphics cursor on a display at a location that corresponds to an indicated touched location. Other method steps include detecting continually touching movement on a touchpad and generating a signal that facilitates movement of a graphics cursor from a previous position in a manner analogous to movement of detected continually touching movement relative to a reference location.

In another embodiment, the present invention includes an electronic apparatus that includes a touchpad; a display; and processing logic coupled between said touchpad and said display that processes touched location signals from said touchpad in such a manner as to provide absolute or relative positioning of a graphics cursor for said display.

The attainment of the foregoing and related advantages and features of the invention should be more readily apparent to those skilled in the art, after review of the following more detailed description of the invention taken together with the drawings.

DETAILED DESCRIPTION

Figure 1:
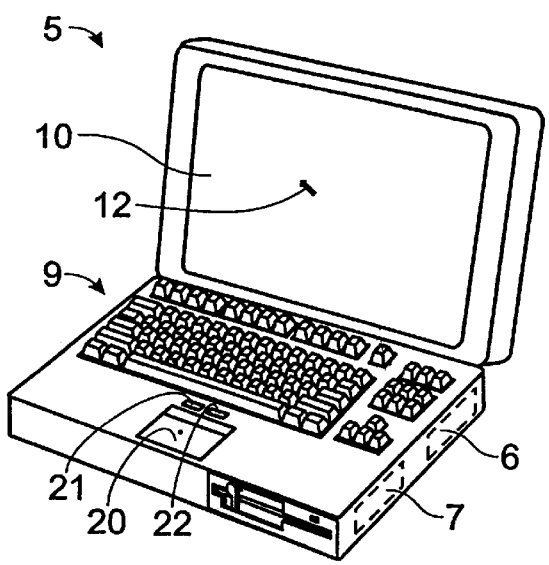
FIG. 1 is a perspective view of a laptop or notebook computer having a touchpad in accordance with the present invention.

Referring to FIG. 1, a perspective view of a laptop or notebook computer 5 having a touchpad 20 in accordance with the present invention is shown. Computer 5 includes components such as a processor or processing logic 6, memory 7 (these two are shown in phantom lines because they are internal), an alphanumeric keypad 9 and a display screen 10. Computer 5 also includes a touchpad 20 for use in controlling a graphics cursor such as a cursor arrow 12 or the like. Control buttons 21,22, analogous to the right and left click buttons of a mouse, may also be provided as is known (although alternatives to such buttons are discussed below). Track pad 20 in conjunction with processing logic 6 provides absolute and relative positioning of graphics cursor 12.

Figure 2:
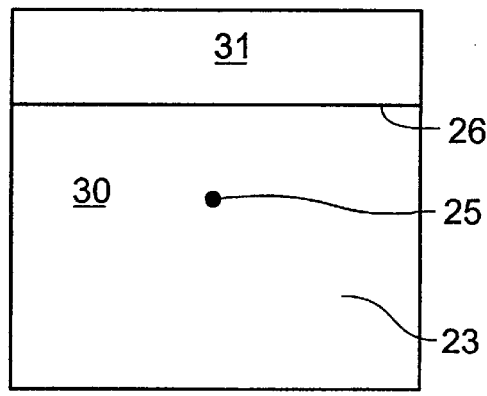
FIG. 2 is a plan view of a touchpad in accordance with the present invention.

Referring to FIG. 2, a plan view of touch pad 20 in accordance with the present invention is shown. Touchpad 20 preferably includes a known touchpad surface 23 that provides an indication of the point on the surface of the touchpad that a user's finger or stylus or the like is touching. In a preferred embodiment, touchpad 20 has at least 50 points per linear inch. Suitable touchpad surfaces are known in the art. In the text that follows, operation of touchpad 20 is described first, followed by a description of logic through which the operation is achieved.

Touchpad 20, in a preferred embodiment, has dimensions of approximately 2"×2" so that it may be readily installed in a notebook computer (FIG. 1), a keyboard (FIG. 4), a stand alone unit or the like. It should be recognized, however, that the touchpad may be made of any desired dimensions without departing from the scope of the present invention. Touchpad 20 preferably has two markings 25,26 for visual and/or tactile reference. These markings may have a physical relief so that they may be determined by touch or may be painted on or the like. Regardless of how they are embodied, markings 25,26 are provided over or aligned with appropriate regions of the touchpad surface as now discussed.

One marking is a line 26 that is preferably provided approximately ½" or ¼" from an edge (the top edge in FIG. 2) of the touchpad. Line 26 divides touchpad 20 into a first region 30 that is approximately 1 and ½"×2" and maps to a computer screen such as screen 12 of FIG. 1. It should be recognized that this region has a shape analogous to that of a computer screen, i.e., the horizontal dimension is greater than the vertical dimension. Points in region 30 map to corresponding points in an associated display screen such that absolute positioning can be achieved. Designation of a point in region 30, with a finger or stylus or the like (hereinafter referred to as a "finger"), preferably invokes a software routine executed by processing logic 6 or equivalent logic (discussed in more detail below with reference to FIG. 3) that moves a predefined graphics cursor to a location on the associated display screen that corresponds to the point touched.

Since touchpad 20 may be small compared to a display screen, there may not be enough points on touchpad 20 to permit accurate placement of a graphics cursor. Relative positioning is, therefore, preferably invoked to achieve this fine placement and dot or location 25 preferably provides a reference point for relative positioning.

After a point in region 30 has been touched by a finger (absolute positioning), the act of sliding that finger (as opposed to lifting the finger off the touchpad) preferably invokes relative positioning. The graphics cursor (on screen 12) does not move while the finger is being moved towards dot 25, however, movement away from the dot causes the cursor to move in that direction. Movement from a touched location is preferably processed using an x-y coordinate system.

The region above line 26 (region 31) is provided so that a user can invoke relative positioning directly. If a user first places their finger in region 31, i.e., above line 26, and slides that finger towards dot 25, then relative positioning is invoked.

To emphasize the preferred operation of touchpad 20, the following four principles of operation are espoused:

(1) When a finger first makes contact with the touchpad, if the point of the contact is below horizontal line 26, then the graphics cursor is immediately moved to the point on the display screen that corresponds to the point in the lower area 30 of the touchpad where contact was made. Making contact with the touchpad above line 26 does not change the position of the graphics cursor.

(2) Sliding a finger towards the center dot from any point on the touchpad (maintaining contact with the pad as the finger is slid) will not move the graphics cursor.

(3) Sliding a finger away from the center dot from any point on the touchpad (again, maintaining contact with the touchpad) will move the graphics cursor in the direction indicated by the direction the finger is slid.

Figure 3:
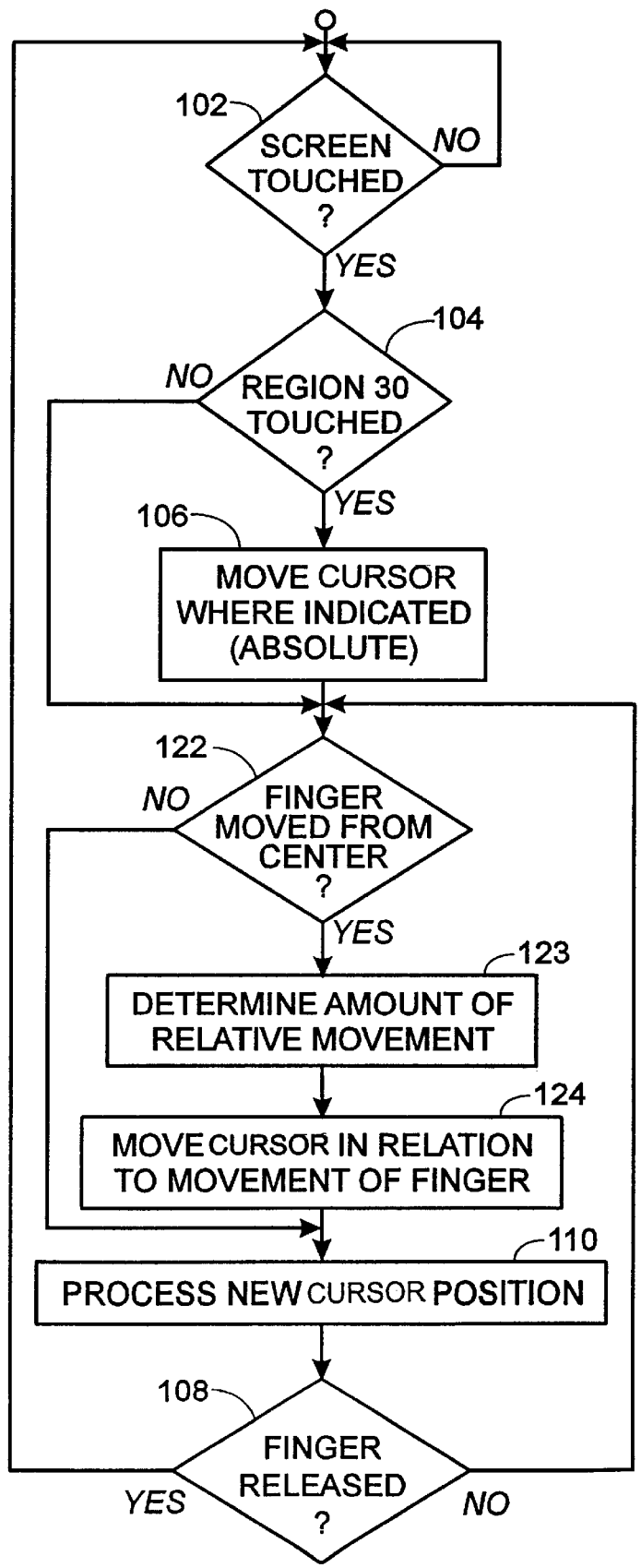
FIG. 3 is a flow diagram of logic that implements the operation of a touchpad in a word processing application in accordance with the present invention.

(4) The distance or rate of speed at which the graphics cursor is moved in response to an outward movement of the finger is a function of the distance of the finger from the center dot. Movement near the edge of the touchpad preferably results in a larger movement of the graphics cursor than a movement near the center dot. Note that there should be a smooth transition from small movements of the graphics cursor to large movements as the finger is slid outward, however, the transition need not be linear. Referring to FIG. 3, a flow diagram of logic that implements the operation of touchpad 20 in a word processing application in accordance with the present invention is shown. It should be recognized that the flow diagram of FIG. 3 is for a representative word processing application and the formation of graphics cursors in other word processing applications and in non-word processing applications (e.g. spread sheet applications, design applications, etc.) may differ without departing from the scope of the present invention. In a preferred embodiment, the logic of FIG. 3 is implemented as software that is executed by the processor of the computer with which the touchpad is used, e.g., processor 6 of computer 5. This software may be installed as device driver software. Where appropriate, the logic of FIG. 3 produces signals (e.g., output signals) that interact with known display graphics generation logic to create the computer or other electronic device display.

At step 102, a determination is made as to whether touchpad 20 has been touched. If it has, a determination is made in step 104 as to whether region 30 has been touched thus invoking absolute positioning. If region 30 was touched, a location indicating graphics cursor is moved in the on-screen display to a location that corresponds to the point touched (step 106). If region 30 was not touched, then by default region 31 that invokes relative position was touched.

In step 122, a determination is made as to whether the finger is moved away from the center (or other designated reference location) of the touchpad.

If it has been, then a relative movement coefficient is calculated based on the position of the finger relative to the center of the touchpad (step 123). In a preferred embodiment, the amount of relative movement is increased as the distance from the center increases (discussed in more detail below). In step 124, the position indicating graphics cursor is moved by the appropriate relative amount. This or like schemes provide accelerated-type relative positioning.

In step 110, processing related to the new graphics cursor position is performed. This may involve implementing a drag and drop or cut and paste or the like.

If the finger is released at step 108, then flow proceeds to step 102. If the finger is not released, then flow proceeds to step 122.

Referring more specifically to the processing of step 110 that may be invoked in response to clicking a conventional mouse, it should be recognized that alternatives to mouse button depressions or the like for implementing graphics cursor movement are contemplated and within the present invention. Such alternatives may include detecting the touching of a second distinct location on touchpad 20. The detection of a second distinct touch could be treated the same as a control button depression. An alternative embodiment has been contemplated that includes tapping the touchpad screen. In this embodiment, an additional parameter such as time is added that would respond to a tap or taps that occurs within a predefined time period. If a second distinct touching of the touchpad is detected within this predefined time period, a control signal is generated. This control signal could be treated the same as a control button depression or perform some other function.

Referring more specifically to the processing of step 123, one location based relative position scheme may be implemented as now described. The below parameters are defined as stated:

| | |
|---|---|
| Xa | x coordinate of old finger position on touchpad |
| Ya | y coordinate of old finger position on touchpad |
| Xb | x coordinate of new finger position on touchpad |
| Yb | y coordinate of new finger position on touchpad |
| X0 | x coordinate of center dot on touchpad |
| Y0 | y coordinate of center dot on touchpad |
| Px | x coordinate of current graphics cursor on screen |
| Py | y coordinate of current graphics cursor on screen |
| Qx | x coordinate of next graphics cursor on screen |
| Qy | y coordinate of next graphics cursor on screen |
| K | constant dependent on particular hardware characteristics. |

The objective is to compute Qx and Qy from the other parameters listed above. Assuming that the criteria for absolute positioning are maintained,

```
If (X0 < Xa) and (Xa < Xb)
    Then Qx = Px + K*(Xa - X0)*(Xb - Xa)
Else if (X0 > Xa) and (Xa > Xb)
    Then Qx = Px - K*(X0 - Xa)*(Xa - Xb)
    Else Qx = Px
If (Y0 < Ya) and (Ya < Yb)
    Then Qy = Py + K*(Ya - Y0)*(Yb - Ya)
Else if (Y0 > Ya) and (Ya > Yb)
    Then Qy = Py - K*(Y0 - Ya)*(Ya - Yb)
    Else Qy = Py.
```

With reference to the above constant K, this constant determines the magnitude of movement of graphics cursor position relative to movement on the touchpad surface. The constant is dependent on size and resolution of screen, size and resolution of touchpad, and sampling rate of touchpad position.

Figure 4:
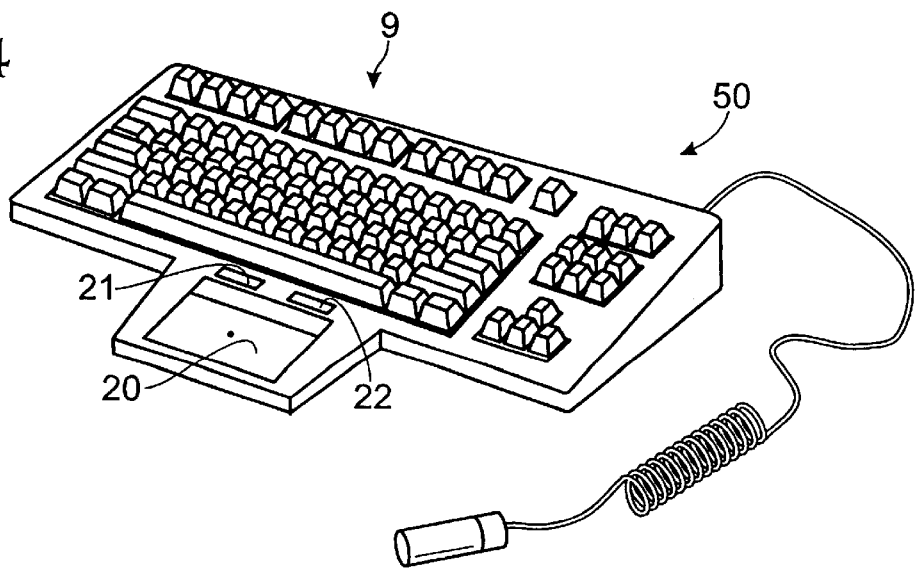
FIG. 4 is an embodiment of a keyboard in accordance with the present invention.

Referring to FIG. 4, an embodiment of a keyboard 50 in accordance with the present invention is shown. Keyboard 50 consists of an alphanumeric keypad or the like 9 such as that found on conventional computer keyboards. Keyboard 50 also includes touchpad 20 and in at least one embodiment control buttons 21,22 (or an equivalent therefor).

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In an electronic device, a method of positioning a graphics cursor based on movements of a user's finger, comprising the steps of:

detecting a first touching of a touchpad;

determining whether said first touching occurred in a first region of said touchpad that invokes an absolute positioning mode of operation or in a second location of said touchpad that invokes a relative positioning mode of operation, said second region being restricted to an area between said first region and a keyboard of said electronic device;

generating, in said absolute positioning mode of operation, a signal that facilitates positioning of a graphics cursor on a display at a location that corresponds to the location of said first touching; and generating, in said relative position mode of operation, a signal that facilitates a relative positioning of a graphics cursor on a display.

2. The method of claim 1, wherein said determining step further comprises the steps of:

detecting continually touching movement from said first touching; and invoking said relative positioning mode of operation upon detection of said continually touching movement relative to a reference location.

3. The method of claim 2, further comprising the step of:

generating a cursor movement signal that facilitates movement of a graphics cursor relative to a previous position in a manner analogous to movement of the detected continually touching movement relative to said reference location.

4. The method of claim 3, further comprising the step of:

detecting when said continually touching movement is within a predefined distance of said reference location; and generating a modified cursor movement signal that modifies the rate by which a graphics cursor is moved relative to a continually touching movement when said continually touching movement is within the predefined distance.

5. The method of claim 1, further comprising the step of:

detecting a second distinct and simultaneous touching of said touchpad; and generating a control signal in response to detection of said second distinct and simultaneous touching.

6. The method of claim 1, further comprising the steps of:

detecting a second distinct touching of said touchpad within a predefined time period of an end of said first touching or an end of said continually touching movement; and generating a control signal in response to detection of said second distinct touching.

7. An electronic apparatus, comprising:

a touchpad, that is manipulated by a user's finger;

a display; and processing logic coupled between said touchpad and said display that processes touched location signals from said touchpad and determines whether a touched location is in a first region that invokes an absolute positioning mode of operation or in a second region that invokes a relative positioning mode of operation, said second region being restricted to an area between said first region and a keyboard of said electronic apparatus.

8. The apparatus of claim 7, wherein said processing logic comprises continually touching movement detection logic that detects continually touching movement and in response to detecting such continually touching movement invokes said relative positioning mode of operation.

9. The apparatus of claim 7, wherein said processing logic comprises absolute positioning logic that generates a signal that facilitates positioning of a graphics cursor in said display at a location that corresponds to a touched location within said first region.

10. The apparatus of claim 8, wherein said processing logic comprises relative positioning logic that generates a signal that facilitates positioning of a graphics cursor from a previous position in said display in a manner analogous to said continually touching movement on said touchpad relative to a reference location.

11. The apparatus of claim 10, wherein said relative positioning logic includes logic that modifies an amount by which said graphics cursor is moved in response to said continually touching movement when said continually touching movement enters a predefined region of the touchpad within which the rate of relative movement is increased.

12. The apparatus of claim 7, further comprising logic that detects two simultaneous and distinct touchings on said touchpad and generates a control signal in response to the detection of said two simultaneous and distinct touchings.

13. The apparatus of claim 7, further comprising logic that detects two distinct touchings within a predefined time period on said touchpad and generates a control signal in response to the detection of said two distinct touchings within a predefined time period.

14. In an electronic apparatus, a method of positioning a graphics cursor in response to the movement of a user's finger, comprising the steps of:

receiving a touched location indicating signal from a touchpad;

determining from said touched location indicating signal whether to invoke an absolute positioning mode of operation or a relative positioning mode of operation, said absolute positioning mode being invoked when said touched location lies within a first region, said relative positioning mode being invoked when said touched location lies within a second region, said second region being restricted to an area between said first region and a keyboard of said electronic apparatus;

generating, in said absolute positioning mode of operation, a signal that facilitates positioning of a graphics cursor on a display at a location that corresponds to an indicated touched location; and moving said graphics cursor when said user's finger moves in a direction away from the center of said touch pad.

* * * * *

UNITED STATES PATENT AND TRADEMARK OFFICE
CERTIFICATE OF CORRECTION

PATENT NO. : 6,559,833 B2 Page 1 of 1
APPLICATION NO. : 09/164939
DATED : May 6, 2003
INVENTOR(S) : Rowe It is certified that error appears in the above-identified patent and that said Letters Patent is hereby corrected as shown below:

In the Claims

Col. 6 (line 40), delete "rate" and insert therefor --amount--.

Signed and Sealed this

Fourth Day of September, 2007

JON W. DUDAS
*Director of the United States Patent and Trademark Office*